United States Patent
Rufli et al.

(10) Patent No.: US 11,205,287 B2
(45) Date of Patent: Dec. 21, 2021

(54) ANNOTATION OF DIGITAL IMAGES FOR MACHINE LEARNING

(71) Applicant: International Business Machines Corporation, Armonk, NY (US)

(72) Inventors: Martin Rufli, Winterthur (CH); Ralf Kaestner, Othmarsingen (CH); Alexander Velizhev, Oberrieden (CH); Peter Willem Jan Staar, Wadenswil (CH); Michele Dolfi, Zurich (CH); Elliot Jacques Vincent, Paris (FR); Christoph Auer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/832,133

(22) Filed: Mar. 27, 2020

(65) Prior Publication Data

US 2021/0304463 A1   Sep. 30, 2021

(51) Int. Cl.
*G06T 11/20* (2006.01)
*G06N 20/00* (2019.01)
(Continued)

(52) U.S. Cl.
CPC .............. *G06T 11/203* (2013.01); *G06N 3/08* (2013.01); *G06N 20/00* (2019.01); *G06T 11/206* (2013.01);
(Continued)

(58) Field of Classification Search
CPC ...... G06T 11/203; G06T 11/206; G06T 11/60; G06N 20/00; G06N 3/08
(Continued)

(56) References Cited

U.S. PATENT DOCUMENTS 9,959,623 B2   5/2018 Mays
10,013,781 B1 * 7/2018 Gammage .............. G06N 5/047
(Continued)

FOREIGN PATENT DOCUMENTS

CN   107788600 A    3/2018
CN   110475505 A    11/2019
(Continued)

OTHER PUBLICATIONS

"ImageNet", © 2016 Stanford Vision Lab, Stanford University, Princeton University, 1 page, <http://image-net.org/Index>.
(Continued)

*Primary Examiner* — Hai Tao Sun
(74) *Attorney, Agent, or Firm* — Brian M. Restauro

(57) ABSTRACT

Computer-implemented methods and apparatus are provided for annotating digital images of line plots with ground truth labels. For each digital image, such a method includes supplying image data defining the image of a line plot to a machine-learning model trained to generate a set of control points defining a spline corresponding to the line plot. The method further comprises displaying the spline, and the set of control points, superimposed on the image in a graphical user interface and, in response to user manipulation via the graphical user interface of one or more control points, dynamically adjusting the displayed spline in accordance with manipulated control points whereby the displayed spline can be adjusted for conformity with the line plot. The set of control points for the adjusted spline is then stored as a ground truth label for the image.

18 Claims, 6 Drawing Sheets

(51) Int. Cl.
*G06T 11/60* (2006.01)
*G06N 3/08* (2006.01)

(52) U.S. Cl.
CPC .... *G06T 11/60* (2013.01); *G06T 2207/20081* (2013.01)

(58) Field of Classification Search
USPC .......................................................... 345/442
See application file for complete search history.

(56) References Cited

U.S. PATENT DOCUMENTS

| | | | |
|---|---|---|---|
| 10,049,093 | B2 | 8/2018 | Grady |
| 2014/0351678 | A1 | 11/2014 | Lemberger |
| 2019/0095806 | A1 | 3/2019 | Martinez Canedo |
| 2019/0294970 | A1* | 9/2019 | Fidler ................ G06K 9/00805 |

FOREIGN PATENT DOCUMENTS

| | | |
|---|---|---|
| CN | 110516318 A | 11/2019 |
| CN | 107977605 B | 4/2020 |
| WO | 2017091833 A1 | 6/2017 |

OTHER PUBLICATIONS

"Lines & Splines Human-powered lines, polylines and splines for precise lane detection training for autonomous vehicles.". Scale, Copyright ©2020, 14 pages, <https://scale.com/lines-splines>.
"ML data annotations made super easy for teams", Dataturks, Copyright © Trilldata Technologies Pvt Ltd 2018, 4 pages, <https://dataturks.com/>.
"PixelAnnotationTool", abreheret, Printed Mar. 11, 2020, 3 pages, <https://github.com/abreheret/PixelAnnotationTool>.
"Sloth", Printed Mar. 11, 2020, 2 pages, <https://sloth.readthedocs.io/en/latest/>.
"Supervisely", The leading platform for entire computer vision lifecycle, © 2020, 4 pages, <https://supervise.ly/>.
Kahou et al., "FigureQA: An annotated figure dataset for visual reasoning", Microsoft, Dec. 2017, 3 pages, <https://www.microsoft.com/en-US/research/publication/figureqa-an-annotated-figure-dataset-for-visual-reasoning/>.
Krizhevsky et al., "The CIFAR-10 dataset", 2009, 4 pages, <https://www.cs.toronto.edu/~kriz/cifar.html>.
Lecun et al., "THE MNIST DATABASE of handwritten digits", Printed Mar. 11, 2020, 8 pages, <http://yann.lecun.com/exdb/mnist/>.

* cited by examiner

ANNOTATION OF DIGITAL IMAGES FOR MACHINE LEARNING

BACKGROUND

The present invention relates generally to annotation of digital images, and more particularly to annotating digital images of line plots with ground truth labels for use in supervised machine learning applications.

Machine learning provides techniques for processing (often massive) datasets from a real-word application in relation to a basic model for the application in order to train, or optimize, the model for the application in question. The model can then be applied to perform inference tasks based on new (unseen) data generated in that application. For example, in supervised training of machine-learning models for image classification, the model is exposed to a set of training images for which classification labels (ground truth labels) are known. The model is trained via an iterative training process in which successive training images are input to the model. The model output is compared with the ground truth label for each image to obtain an error signal which is used to update the model parameters. In neural network models, for example, error signals for the training images are backpropagated through the network and the network weights are progressively updated as the network "learns" from the training data. The weight updates are calculated so as to optimize a predefined function for the network, e.g. to minimize network error. The resulting trained model, with weights defined via the training operation, can then be applied for classification of new (previously unseen) images.

Annotation of training examples with ground truth labels is a necessary prerequisite for supervised machine learning. This process can be both laborious and costly due to the large volumes of training data required to train accurate models. For image processing applications, annotation is generally done manually by (expert) humans. Various tools and services have been developed to facilitate manual annotation of objects such as roads, vehicles, faces, etc., in images, some examples being: Sloth; Dataturks; Supervisely; and PixelAnnotationTool.

Labelling of digital images of line plots (i.e. graphs representing some function y=f(x) of a variable x) for machine learning applications presents a particular challenge, and efficient tools to facilitate this process would be highly desirable.

SUMMARY

According to one aspect of the present invention there is provided a computer-implemented method for annotating digital images of line plots with ground truth labels. For each digital image, the method includes supplying image data defining the image of a line plot to a machine-learning model trained to generate a set of control points defining a spline corresponding to the line plot. The method further comprises displaying the spline, and the set of control points, superimposed on the image in a graphical user interface and, in response to user manipulation via the graphical user interface of one or more control points, dynamically adjusting the displayed spline in accordance with manipulated control points whereby the displayed spline can be adjusted for conformity with the line plot. The set of control points for the adjusted spline is then stored as a ground truth label for the image.

Embodiments of the invention provide highly efficient methods for annotating digital images of line plots. Ground truth labels are generated as a set of control points for a spline. A spline can approximate a line plot to arbitrary closeness depending on the number of control points defining the spline, and most curves can be well-approximated with a small number of control points. A machine-learning model is used to generate an initial set of spline control points, and the spline with its control points is superimposed on the line plot image in the GUI (graphical user interface). Since splines are uniquely defined by their control points, and each control point has a localized influence on the overall form of the spline, a user can quickly and easily bring the spline into conformity with the line plot simply by manipulating control points as the displayed spline is dynamically adjusted in the GUI. The control points for the adjusted spline then provide a convenient ground truth label for the image.

In preferred embodiments, the machine-learning model comprises a recurrent neural network (RNN). This enables efficient generation of a spline with an appropriate (variable) number of control points by successively adding control points to the set until the spline is adequately defined. The RNN may be trained to generate, for each added control point, a stop probability whose value indicates a measure of correspondence between the spline and the line plot. In such embodiments, the method may successively add control points in the RNN until the stop probability traverses a threshold level. Training of such an RNN can be based on optimizing a function, e.g. minimizing an error function, dependent on difference between control points and stop probabilities generated by the network for training images and predetermined (ground truth) control points/stop probabilities for the training images.

In other embodiments, the RNN may be trained for generating the set of control points based on optimization of a function dependent on offset between points on the spline and points on the line plot in an image. In these embodiments, the method may successively add control points in the RNN until a stop criterion dependent on this offset is satisfied. Here, operation is based on the critical aspect of interest, i.e. conformity of the spline with the line plot, rather than conformity of control points. The training process may be supervised or self-supervised in these embodiments.

To accommodate images containing more than one line plot, preferred embodiments can preprocess an input image, comprising one or more line plots, to produce the image data for an image of a single line plot for supply to the machine-learning model and, if the input image contains any further line plots, iteratively preprocess the input image to produce the image data for each further line plot for supply to the machine-learning model. This preprocessing of input images can be efficiently performed in an attention-based recurrent neural network.

Advantageously, after annotating a set of digital images with respective ground truth labels, methods embodying the invention may use the set of images as training images for further training of the machine-learning model via a supervised learning process. The base model can thus be progressively improved as more images are annotated.

A further aspect of the invention provides a computer program product comprising a computer readable storage medium embodying program instructions, executable by a computing apparatus, to cause the computing apparatus to perform a method for annotating digital images of line plots as described above.

An additional aspect of the invention provides a computing apparatus comprising memory for storing digital images of line plots and control logic adapted to implement a method for annotating the images as described above.

Embodiments of the invention will be described in more detail below, by way of illustrative and non-limiting example, with reference to the accompanying drawings

BRIEF DESCRIPTION OF THE DRAWINGS

In the following embodiments of the invention are explained in greater detail, by way of example only, making reference to the drawings in which.

DETAILED DESCRIPTION

Figure 1:
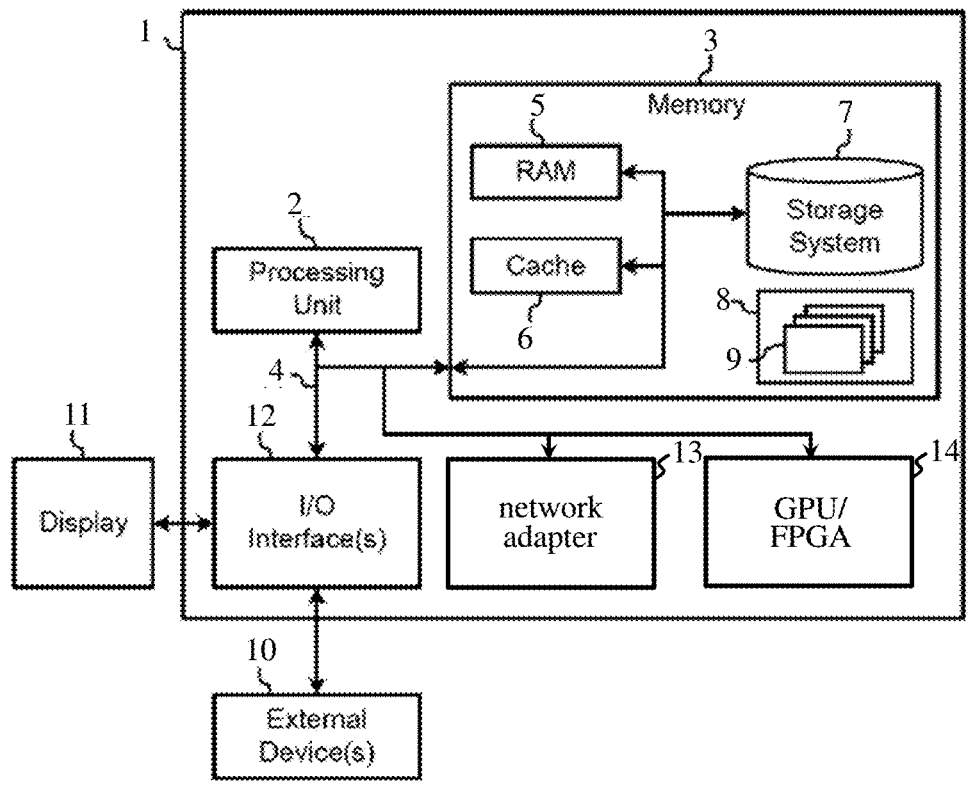
FIG. 1 is a schematic representation of a computing apparatus for implementing methods embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide computer-implemented methods for annotating digital images of line plots with ground truth labels. Such methods may be implemented by computing apparatus comprising one or more general- or special-purpose computers, each of which may comprise one or more (real or virtual) machines, providing functionality for implementing operations described herein. Steps of methods embodying the invention may be implemented by program instructions, e.g. program modules, implemented by a processing device of the apparatus. Generally, program modules may include routines, programs, objects, components, logic, data structures, and so on that perform particular tasks or implement particular abstract data types. The computing apparatus may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing steps of methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as an FPGA or GPU (graphics processing unit), for implementing embodiments of the invention. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
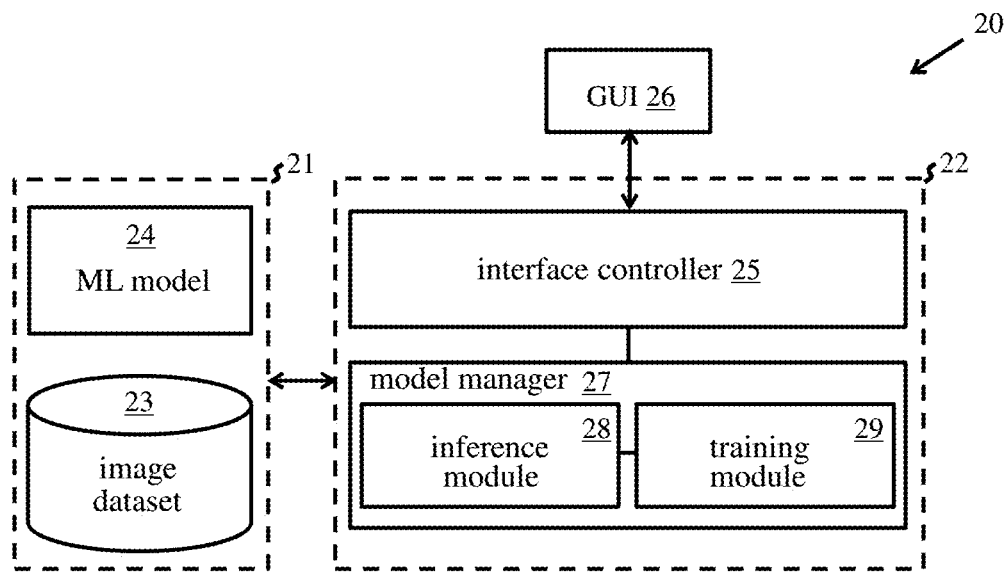
FIG. 2 is a schematic representation of component modules of a computing apparatus for implementing methods embodying the invention.

FIG. 2 is a schematic representation of component modules in an exemplary computing apparatus for implementing methods embodying the invention. The apparatus 20 comprises memory 21 and control logic indicated generally at 22. Memory 21 stores a set of digital images 23 (also referred to as image data set 23) to be processed by apparatus 20, and parameters defining a machine-learning (ML)

model 24 used in operation of the apparatus. Control logic 22 comprises an interface (I/F) controller module 25 (also referred to as I/F controller 25) for controlling operation of a GUI 26, and a model manager 27, comprising inference and training modules 28 and 29, for managing operation of model 24.

Image dataset 23 stores the image data for a set of images of line plots, i.e. graphs representing some function y=f(x) of a variable x. Such line plots are commonly included in scientific papers, business reports, etc., and may depict line plots in various ways, e.g. as continuous or broken lines, as strings of plotted points, as a combination of points and lines, or any other representation of a line plot defining some continuous mapping from a variable x to a variable y. Such line plot images may be extracted from scanned or otherwise electronically generated images, e.g. as part of a workflow for extracting information and generating queryable data structures for information presented in images.

ML model 24 defines the parameters of a model which is (wholly or partially) trained to process a line plot image as described further below. Preferred embodiments herein employ neural network models, and in particular recurrent neural networks (RNNs). In general, however, model 24 may comprise any ML model adapted to implement the functionality required, and may comprise one or more component models which may operate sequentially or in parallel in an image processing operation.

In operation, the control logic 22 controls operation of apparatus 20 to implement an image annotation method. I/F controller 25 of this logic comprises functionality for providing the GUI 26, described further below, for display by a user computer. This module controls information displayed in the GUI 26 and is responsive to user inputs via the GUI in an image annotation operation. In general, a GUI 26 may be provided at one or more user computers for operator input in annotation of images in dataset 23. Model manager 27 controls implementation of training and inference operations in model 24, and provides inference results to I/F controller 25 in an image annotation operation.

In general, memory 21 may comprise one or more types of memory/storage components and the component modules of apparatus 20 may be provided in one or more computers of a computing system. For example, all modules may be provided in a user computer 1 at which GUI 26 is displayed to a user. Alternatively, for example, apparatus 20 may be implemented in a client/server system comprising one or more servers to which user computers (clients) can connect via a network. Such a server system may be implemented as a front-end/back-end system in which ML model 24 and/or image dataset 23 are provided in a back-end server, and a front-end computer/server implements control logic 22. Front-end functionality may be implemented entirely in a user computer displaying GUI 26, or control logic 22 may be wholly or partially implemented in a server which provides for presentation of a GUI 26 at a remote user computer, e.g. via a browser, and interaction with the back-end system.

In general, modules 25 through 29 of apparatus 20 may be implemented by software, e.g., program modules, or hardware or a combination thereof. Functionality may be allocated differently between component modules in apparatus embodying the invention, and functionality of one or more modules may be combined.

Figure 3:
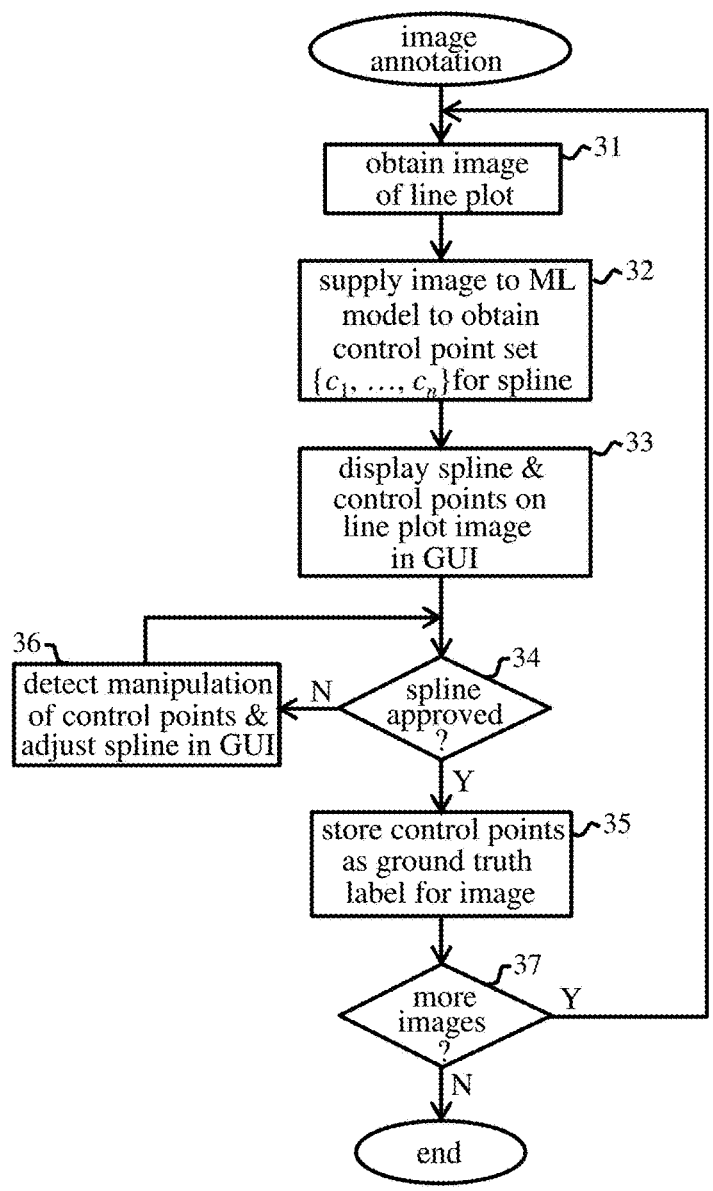
FIG. 3 indicates steps of a digital image annotation method embodying the invention.

FIG. 3 indicates basic steps of an image annotation method performed by apparatus 20. In step 31, model manager 27 obtains an image to be annotated from dataset 23. The selected image may also be supplied to I/F controller 25 for initial display in GUI 26 as described below. In step 32, inference module 28 implements an inference operation using model 24. In this operation, the image data defining the line plot image is supplied to the model to generate a set of control points $\{c_1, c_2, \ldots, c_n\}$, $n \geq 3$, which define a spline corresponding to the line plot. Model manager 27 supplies the line plot image and the resulting control points to I/F controller 25. In step 33, I/F controller 25 displays the line plot image in GUI 26 with the set of control points $\{c_1, c_2, \ldots, c_n\}$, and the spline defined by these control points, superimposed on the image. The I/F controller then awaits user input via the GUI. If the user input indicates approval of the spline ("Yes" (Y) at decision block 34), then operation proceeds to step 35 in which the initial set of control points $\{c_1, c_2, \ldots, c_n\}$ are stored in dataset 23 as a ground through label for the image. The control points are conveniently stored as pixel locations in the image. If user manipulation of control points in the GUI is detected by I/F controller 25 in step 36, the I/F controller dynamically adjusts the displayed spline in accordance with manipulated control points. Here, if the user moves, adds or deletes one or more control points, an adjusted spline defined by the modified set of control points is displayed in the GUI. In this way, the user can adjust the displayed spline as required for conformity with the line plot in the image. After adjusting the spline into a desired degree of conformity with the line plot, the user can approve the adjusted spline via input in the GUI. On detecting approval at step 34, I/F controller 25 stores the set of control points for the adjusted spline as the ground truth label for the image in step 35. Operation then proceeds to step 37 where model manager 27 decides whether further images require annotation in dataset 23. If so, operation reverts to step 31 for annotation of the next image. When all images have been annotated at decision step 37, the annotation process is complete.

The inference operation of step 32 is described in more detail below for an exemplary embodiment. In this embodiment, the ML model 24 comprises an RNN. RNNs are well-known neural network models in which weighted signals are relayed between interconnected "neurons" of the network. Network weights ("synaptic weights") are associated with respective neuron-neuron connections, and signals transmitted over each connection are weighted by the corresponding network weight. Weighted signals can thus be propagated over successive layers of network neurons in response to a network input supplied to a set of input neurons. The resulting network output depends on the network weights, and these weights can be trained to process input signals, and generate output signals, in a desired manner. RNNs operate in a series of time steps, or iterations, and the network output at each time step depends on the network state in previous time steps.

Figure 4A:
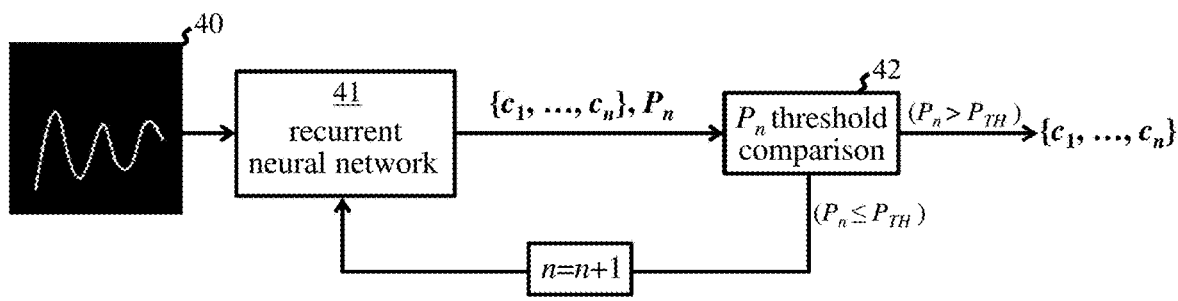
FIGS. 4a and 4b illustrate operation of a machine-learning model used in one embodiment of the image annotation method.

FIG. 4a illustrates the inference operation in this embodiment. A line plot image 40 is input to an RNN 41 by mapping image pixels to input neurons of the RNN. The image data representing individual pixels, or groups of pixels, is thus supplied as input signals to the corresponding input neurons. The weights of RNN 41 are trained via a process detailed below such that, in successive time steps $n=1, 2, 3, \ldots$, of the RNN operation, RNN 41 generates control points for a spline dependent on the shape and location of the line plot in the image 40 supplied to the network. Splines are well-known functions for modeling curves/trajectories, etc., and can be defined in a piecewise manner by various (additive or multiplicative) functions such as polynomials. Each piece, or segment, of a spline is defined by a control point in the space in question, here the area of digital image 40, and complexity of the spline shape depends on the number of control points. (Complexity also depends on parameters of functions used to define the spline. For example, one segment of a piecewise cubic spline can represent up to a third-degree function).

Figure 4B:
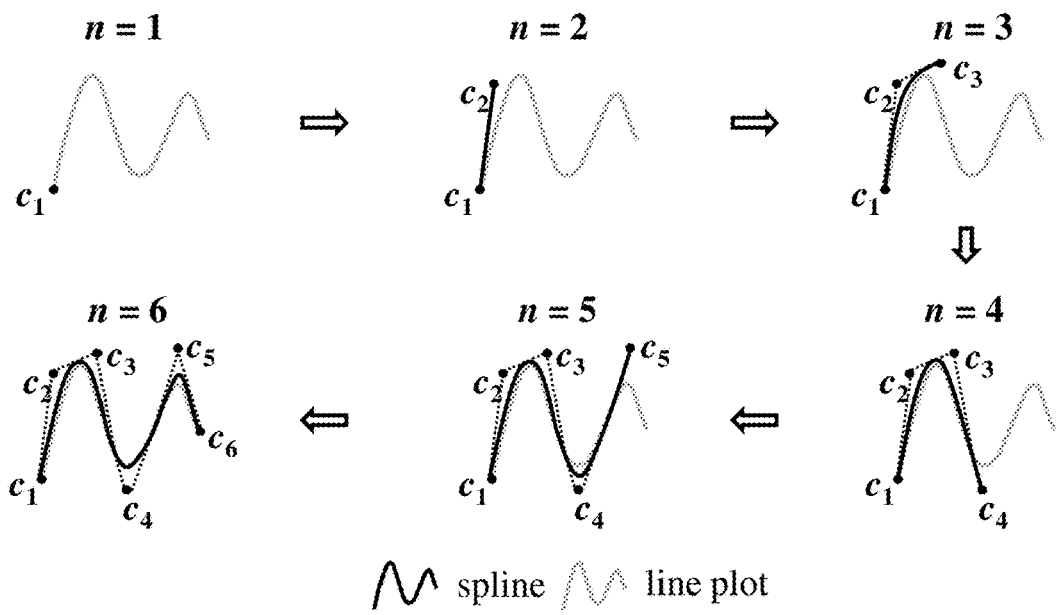

In the first time step, n=1, of RNN operation, the RNN outputs a first control point $c_1$. In the second time step n=2, the RNN generates another control point $c_2$, and control point $c_1$ may be updated accordingly. Time step n=3 generates another control point $c_3$, and points $c_1$ and $c_2$ may be updated accordingly. The RNN thus successively adds control points to the set $\{c_1, \ldots, c_n\}$ with the aim of defining a spline which corresponds to (and is ideally congruent with) the line plot in image 40. For each added control point $c_n$ in the set, the RNN 41 is trained to generate a stop probability $P_n$ ($0 \leq P_n \leq 1$) whose value indicates a measure of correspondence between the spline defined by the current set of control points and the line plot in image 40. In particular, higher values of $P_n$ indicate greater likelihood that sufficient control points have been generated to adequately define a spline corresponding to the line plot. As indicated schematically by comparison block 42 in FIG. 4a, for each time step n of the RNN operation, inference module 28 checks whether the current stop probability $P_n$ exceeds a predetermined threshold value $P_{TH}$. This threshold $P_{TH}$ constitutes a tuning parameter for network operation, and may be set to a desired level, e.g. $P_{TH}=0.5$, based on a desired degree of accuracy for the spline. If $P_n \leq P_{TH}$, then operation continues with the next time step n=n+1 in RNN 41, and a further control point is added to the set. The operation thus iterates, successively adding control points to the set in RNN 41, until the current stop probability $P_n$ traverses the threshold $P_{TH}$. FIG. 4b gives a schematic illustration of an example this process, showing successive sets of control points, with the corresponding spline overlaid on a line plot image, for successive time steps n=1 to 6. (The dotted lines here indicate segments of the spline corresponding to respective control points). Once inference module 28 determines that $P_n > P_{TH}$ for an iteration, the current set of control points $\{c_1, \ldots, c_n\}$ is output by model manager 27 to I/F controller 25.

RNN 41 can be trained to generate the control points and stop probabilities via a supervised learning process using a dataset of training images, each depicting a line plot, for which the ground truth control points and stop probabilities are known. Such training images can be obtained by generating simulated images programmatically, e.g. using standard function graph/chart generating software, such as the Microsoft Excel or Python Matlab tools, for which the ground truth control points $\{C_1, \ldots, C_n\}$ are provided. The ground truth stop probabilities thus follow as $\{P_1=0, P_2=0, \ldots, P_n=1\}$.

Figure 5:
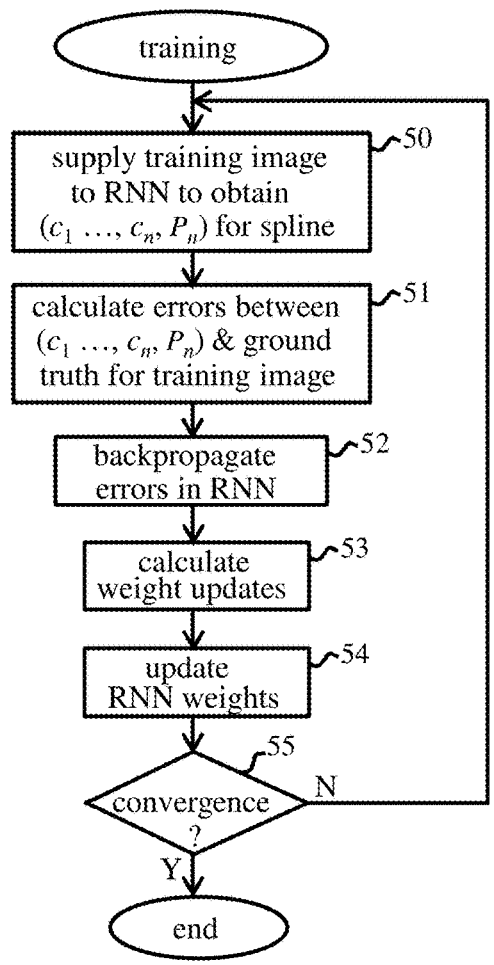
FIG. 5 indicates steps of a training operation for the machine-learning model.

FIG. 5 indicates basic steps of the iterative training operation. In step 50, training module 29 supplies the image data for a training image to RNN 41 to obtain network outputs corresponding to control point sets $\{c_1, \ldots, c_n\}$ and stop probabilities $P_n$ for successive time steps. In step 51, training module 29 compares the network outputs with the ground truth values for the training image to calculate output errors. Error values may be calculated in various ways here. In this example, error values are based on output errors after n time steps for the known number n of control points in the ground truth label for the training image. Other embodiments may calculate error values based on output errors for individual time steps. Step 52 represents backpropagation of the resulting error signals in RNN 41. In step 53, training module 29 calculates updates to the RNN weights based on the backpropagated signals. Weight updates are calculated so as to progressively (over successive iterations) optimize a predefined function for the network. This function is dependent on some measure of difference, or error, between the sets of control points and stop probabilities generated by RNN 41 for the training images and the predetermined (ground truth) control points and stop probabilities for the training images. Various functions may be used here, and the precise form of the function is orthogonal to the process described. Training module 29 updates the weights of RNN 41 in step 54 and, in step 55, decides if the predefined function has been optimized, e.g. if the error has been minimized, signifying that convergence has been achieved. If not, operation reverts to step 50 for another iteration of the training process. Training thus continues with successive training images until convergence is achieved at step 55.

Figure 6A:
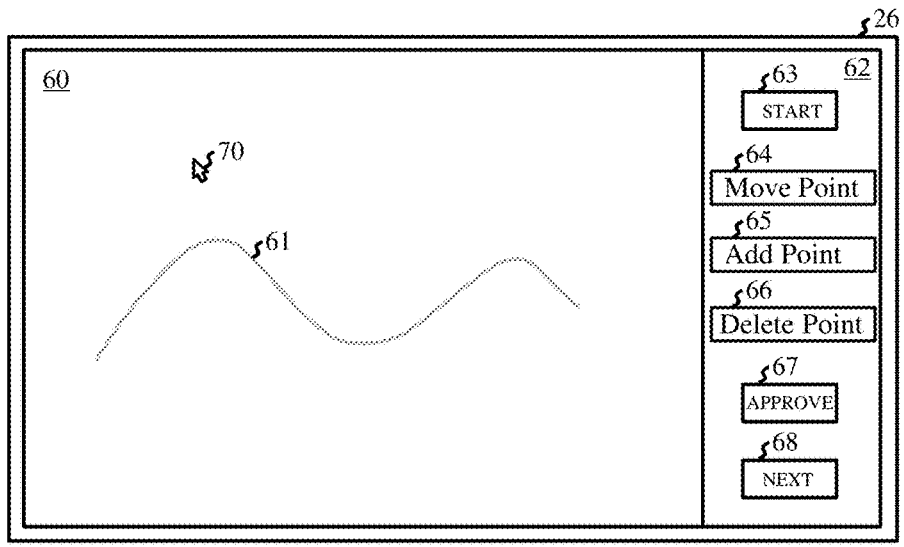
FIGS. 6a through 6d illustrate operation of a GUI provided in methods embodying the invention.
Figure 6B:
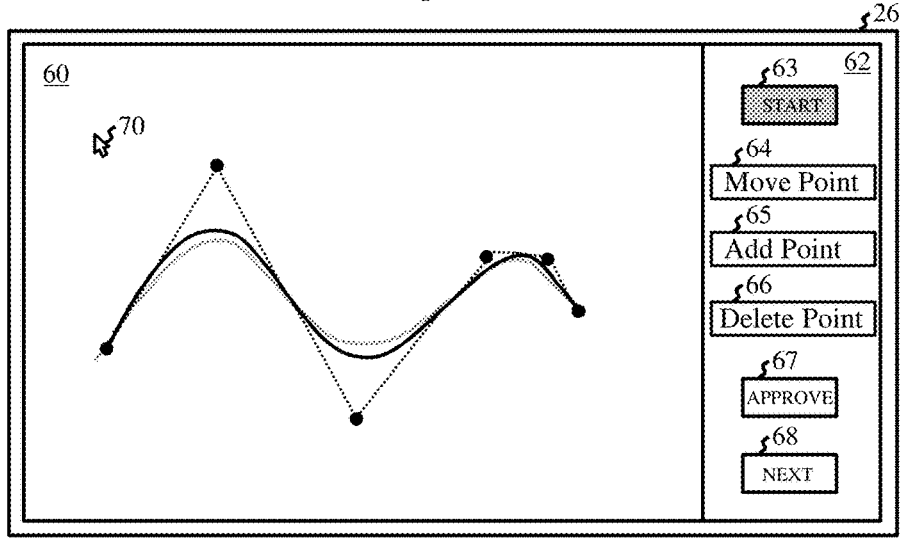
Figure 6C:
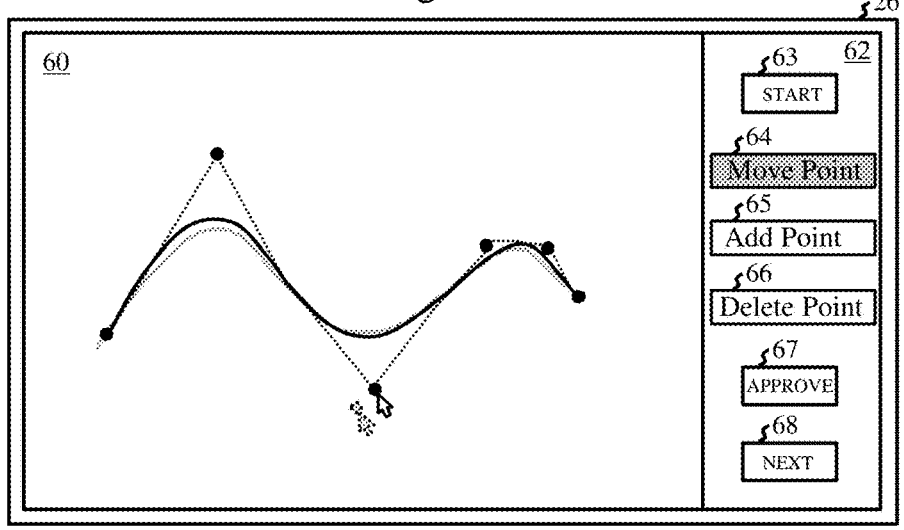
Figure 6D:
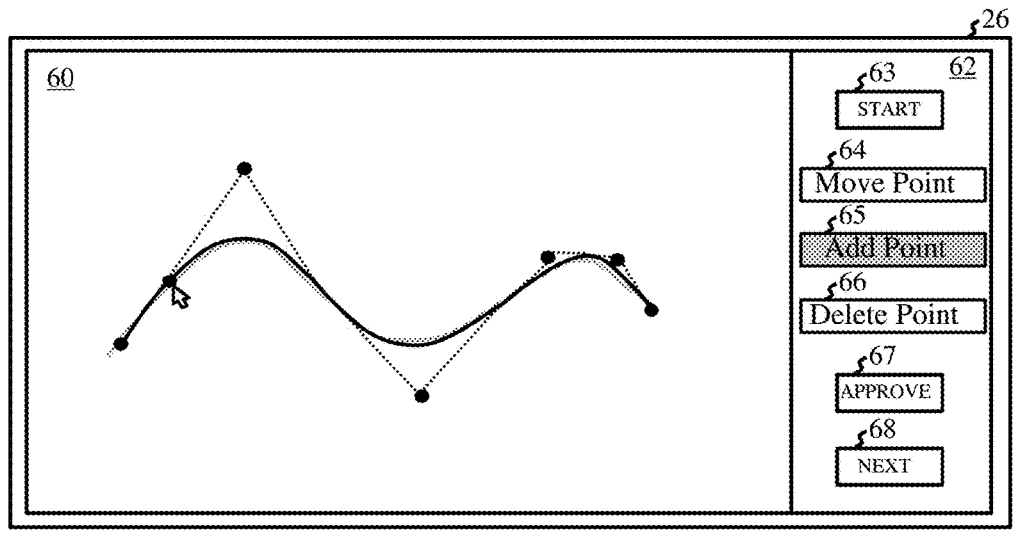

FIGS. 6a through 6d illustrate operation of an exemplary GUI 26 provided by I/F controller 25. The GUI has a workspace area 60 in which the image of a line plot 61 is initially displayed to a user. A control panel 62 is displayed to the right of workspace 60, and presents various options, here as clickable icons, for user input. In this example, control panel 62 includes a "Start" icon, a "Move Point" icon, an "Add Point" icon, a "Delete Point" icon, an "Approve" icon, and a "Next" icon. A pointing device (e.g. a mouse, touchpad, joystick, trackerball, etc.,) at the user computer is used to control a cursor 70 for user inputs to the GUI. When the user clicks the Start icon 63, inference module 28 performs step 32 of FIG. 3, and the resulting spline and control points are displayed (step 33 of FIG. 3) as illustrated in FIG. 6b. The user can then manipulate control points in various ways. The user can move a control point by moving cursor 70 to click and drag the control point in workspace 60. In this example, the user then clicks the "Move Point" icon 64, whereupon I/F controller dynamically adjusts the displayed spline in accordance with the new control point positions as illustrated in FIG. 6c. Alternatively here, I/F controller may adjust the spline automatically as the user drags the control point, in which case the Move Point icon 64 can be omitted from the control panel. By clicking the Add Point icon 65 and then clicking a point in the workspace, the user can add a new control point, and I/F controller then adjusts the displayed spline to accommodate the new control point as illustrated in FIG. 6d. Similarly, any unnecessary control points (for an overly-complex spline) can be deleted by clicking the control point followed by Delete Point icon 66. Again, the displayed spline is adjusted accordingly by I/F controller 25.

When the user has manipulated control points sufficiently to bring the spline into congruence with line plot 61, clicking on Approve icon 67 indicates approval of the spline at step 34 of FIG. 3. The user can then click the Next icon 68 to display the next image to be annotated.

While association between control points and spline segments is indicated schematically by dotted lines in FIGS. 6b though 6d, I/F controller 25 may indicate this association by color coding, whereby each control point and its corresponding spline segment are displayed in a different color. Other alternatives, such as highlighting a spline segment when the user clicks on a control point, may also be envisaged. Note also that, depending on the selected parameterization of the spline, control points may either lie on the spline itself (e.g. using the Catmul-Rom parameterization), or in the vicinity of the spline (e.g. using a basis spline parameterization). While piecewise cubic splines may be suitable for many applications, other spline types may be used if desired.

Figure 7:
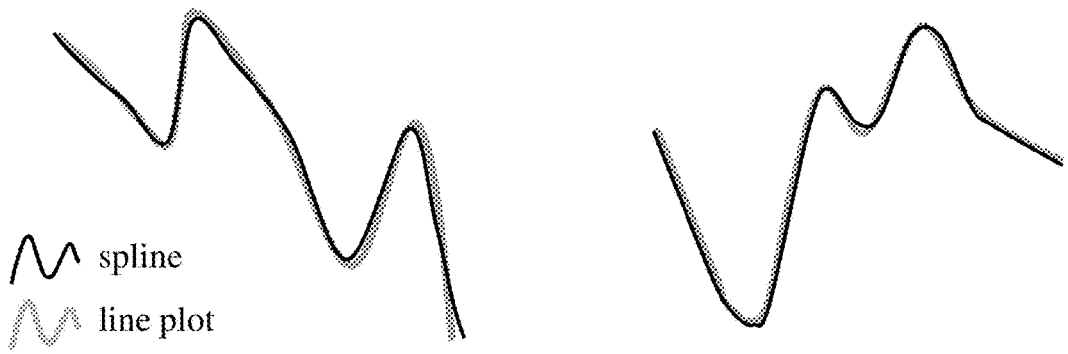
FIG. 7 shows examples of splines generated in a method embodying the invention.

The above method provides a highly efficient technique for annotating digital images of line plots. Deep learning network 41 can be trained to generate an initial set of control points for a spline which closely approximates a line plot image. As illustration, FIG. 7 shows examples of splines corresponding to control points generated in an implementation of RNN 41, demonstrating close correspondence with the underlying line plots. By interactive manipulation of the resulting, relatively small set of control points in GUI 26, the spline can be quickly and easily brought into conformity with the line plot. The control points for the adjusted spline then provide a convenient ground truth label for the image. Methods embodying the invention dramatically speed up the process of annotating line plot images, rendering annotation practical and economical even for difficult use cases, e.g. where large datasets must be annotated to obtain acceptable performance in machine learning applications.

Figure 8:
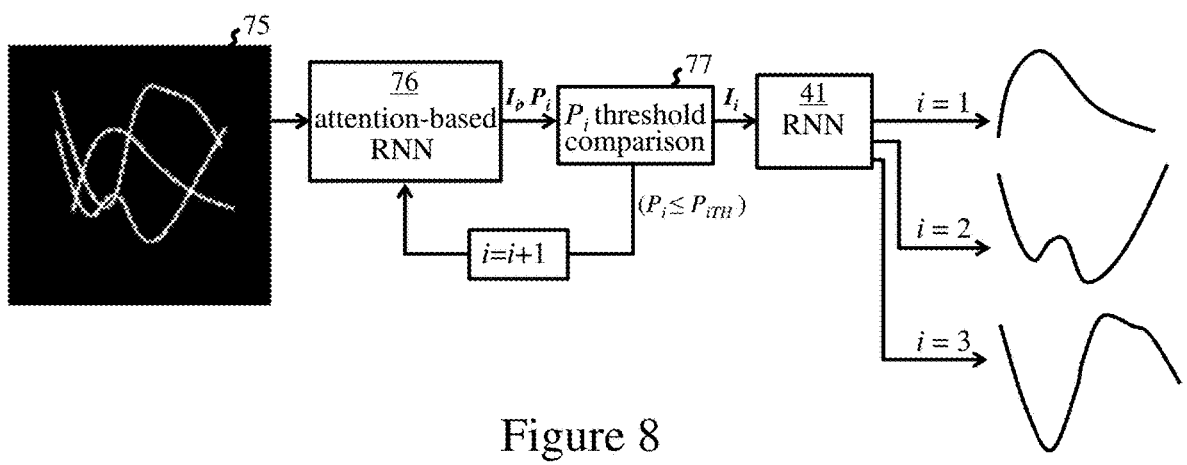
FIG. 8 illustrates processing of input images containing more than one line plot in a method embodying the invention.

In preferred embodiments, inference module 28 can be adapted to accommodate input images from database 23 which contain more than one line plot. FIG. 8 illustrates operation of such an embodiment. An input image 75, which may contain one or more line plots, is preprocessed by inference module 28, here by supplying the image to a further, attention-based RNN 76. This RNN 76 is pretrained to process the input image to produce the image data for an image of a single line plot in the input. This can be achieved by employing an attention mechanism in RNN 76. Attention-based networks are well known in the art and serve to focus attention on different parts of the network input in accordance with attention weights which are learned during the network training operation. In the present case, RNN 76 is trained to focus on one selected line plot in an image by distinguishing pixels defining a given line plot from the background image. The resulting image of a single line plot is then output to RNN 41 for processing as described above. The RNN 76 is trained to generate, with each image $I_i$ output in a time step i of the RNN operation, a stop probability $P_i$ ($0 \leq P_i \leq 1$) whose value indicates likelihood that the input image contains any further line plots. As indicated schematically by comparison block 77 in FIG. 8, for each time step i the inference module 28 checks whether the current stop probability $P_i$ exceeds a predetermined threshold value $P_{iTH}$, e.g. $P_{iTH}=0.5$. If $P_i \leq P_{iTH}$, indicating that the input image contains a further line plot, then operation continues with the next time step i=i+1. RNN 76 then extracts the image of another line plot from the input by focusing attention on another line in the input image. The operation iterates, successively extracting single-line-plot images in RNN 76 until the current stop probability $P_i > P_{iTH}$. The input image is thus iteratively preprocessed over successive iterations i to produce the image data for each line plot which is then processed by RNN 41 as indicated in the figure.

Figure 9:
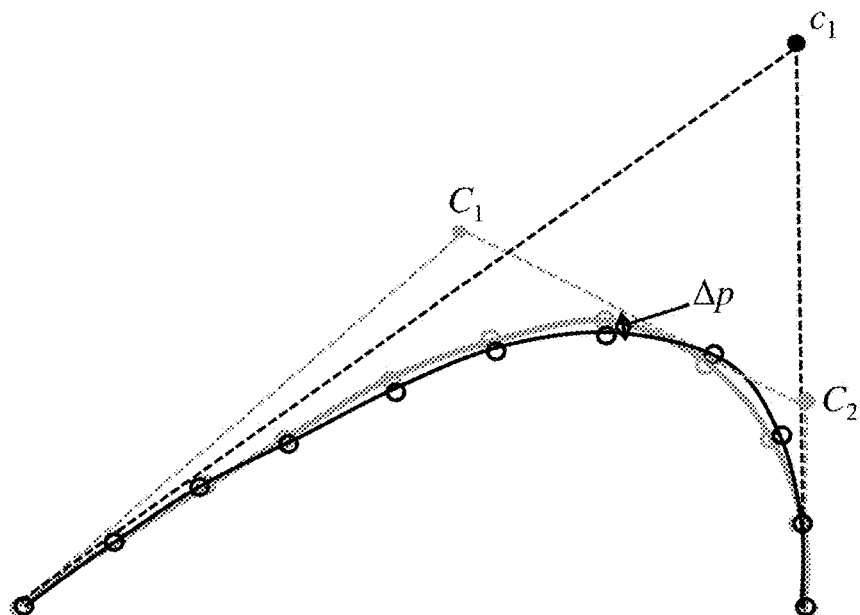
FIG. 9 illustrates an operating principle of a machine-learning model in another embodiment of the image annotation method.

In an alternative implementation of ML model 24, a deep learning network can be trained for generating the set of control points based on optimization of a function dependent on offset between points on the spline and points on the line plot in an image. This principle is illustrated schematically in FIG. 9. This illustrates a spline with a control point $c_1$, generated during training of an RNN, overlaid on a training image of a line plot with ground truth control points $C_1$ and $C_2$. (The start and end control points are unlabeled in this figure). It can be seen that the two curves correspond closely, while the control points are markedly different. Optimization based on offset of control points may therefore lead to additional processing without significant benefit in terms of conformity of the spline and line plot. Since this conformity is the factor of interest, training can alternatively optimize a function dependent on offset between points on the spline and points on the line plot in an image, e.g. a set of equally space points along the curve, or along the x or y axis of the image. The offset for one pair of points is indicated as $\Delta p$ in the figure. An error can be calculated as a function of the offset $\Delta p$ between all pairs of points. This function may also depend on a complexity value (e.g. a function related to the number of control points) in order to penalize over-complexity. The network weights can be updated during training so as to optimize the error function, e.g. to minimize the offset error while restricting complexity in terms of numbers of control points.

Figure 10:
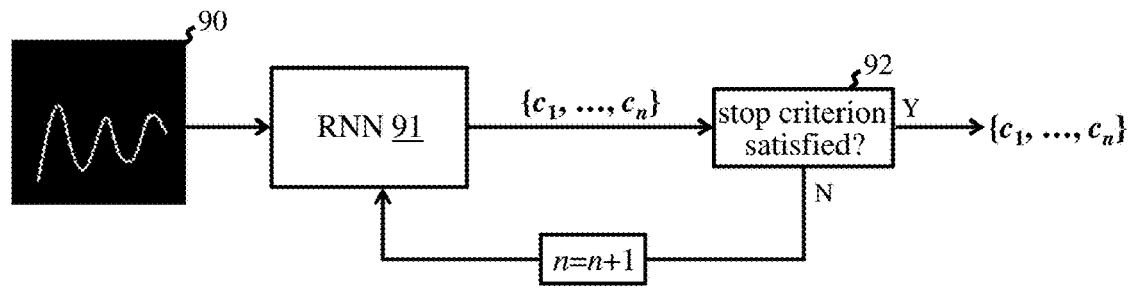
FIG. 10 illustrates operation of a machine-learning model using the FIG. 9 technique.

FIG. 10 illustrates an inference operation in this embodiment. A line plot image 90 is input to an RNN 91, trained as described above, which outputs a set of control points $\{c_1, \ldots, c_n\}$ in each time step n. Inference module 28 uses the control points to reconstruct the spline in the input image and determine if a stop criterion, dependent on the offsets $\Delta p$ and the number of control points, is satisfied as indicated at block 92. This stop criterion can be set to balance spline complexity (number of control points) with conformity of the spline and line plot. If the stop criterion is not satisfied, then operation continues with the next time step n=n+1 in RNN 91, and a further control point is added to the set. The operation thus iterates, successively adding control points to the set in RNN 91, until the stop criterion is satisfied, whereupon the current set of control points $\{c_1, \ldots, c_n\}$ is output by model manager 27 to I/F controller 25. By focusing on offset between curve points, this embodiment offers more efficient training and operation of RNN 91. Overly-complex splines are penalized in a soft manner based on number of control points, avoiding the need for optimization based on ground truth stop probabilities.

Figure 11:
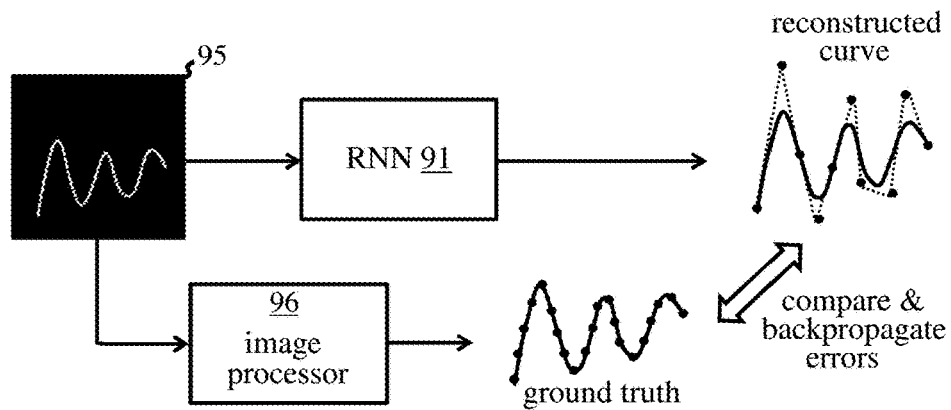
FIG. 11 illustrates self-supervised learning in training of the FIG. 10 model.

In this embodiment, training may be performed via a semi- or self-supervised learning process as indicated schematically in FIG. 11. Here, an input training image 95 supplied to RNN 91 is also supplied to image processing logic 96 in training module 29. This logic may use classic computer vision techniques, such as edge detection, to extract ground truth curve points for the line plot in image 95. Training module 29 can then compare the ground truth points with points on a spline reconstructed from the control points generated by RNN 91, and calculate the offset errors $\Delta p$. The resulting error signals are then backpropagated in RNN 91, and the RNN weights are updated as described above.

It will be appreciated that various other changes and modifications can be made to the exemplary embodiments described. By way of example, embodiments based on other machine learning models, including other neural network models and models based on classic computer vision techniques, may be envisaged.

In general, where features are described herein with reference to a method embodying the invention, corresponding features may be provided in a computing apparatus/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   annotating digital images of line plots with ground truth labels by:
   for each digital image, supplying image data defining a digital image of the digital images of a line plot to a machine-learning model trained to generate a set of control points defining a spline corresponding to the line plot, wherein generating a set of control points defining a spline comprises successively adding control points to the set of control points defining the spline in a recurrent neural network until a stop probability corresponding to a respective control point traverses a threshold level;
   displaying the spline, and the set of control points defining the spline, superimposed on the image in a graphical user interface;
   in response to user manipulation, via the graphical user interface, of one or more control points, dynamically adjusting the displayed spline in accordance with manipulated control points whereby the displayed spline can be adjusted for conformity with the line plot; and
   storing the set of control points defining the spline for the adjusted spline as a ground truth label for the image.

2. The computer-implemented method as claimed in claim 1, wherein the recurrent neural network is trained to generate, for each added control point, a stop probability whose value indicates a measure of correspondence between the spline and the line plot, the method including successively adding control points to said set in the recurrent neural network until said stop probability traverses a threshold level.

3. The computer-implemented method of claim 2, further comprising:
   training the recurrent neural network via an iterative training process comprising, for a set of training images of line plots, supplying image data defining each training image to the recurrent neural network and updating weights of the network to optimize a function dependent on difference between the sets of control points and stop probabilities generated by the network for the training images and predetermined control points and stop probabilities for the training images.

4. The computer-implemented method of claim 1, wherein the recurrent neural network is trained for generating the set of control points based on optimization of a function dependent on offset between points on the spline and points on the line plot in an image, the method including successively adding control points to said set in the recurrent neural network until a stop criterion, dependent on said offset, is satisfied.

5. The computer-implemented method of claim 4, further comprising:
   training the recurrent neural network via an iterative training process comprising, for a set of training images of line plots, supplying image data defining each training image to the recurrent neural network and updating weights of the network to optimize said function.

6. The computer-implemented method of claim 5, further comprising:
   training the recurrent neural network via a self-supervised training process.

7. The computer-implemented method of claim 1, further comprising:
   preprocessing an input image, comprising one or more line plots, to produce said image data for an image of a single line plot for supply to the machine-learning model and, if the input image contains any further line plots, iteratively preprocessing the input image to produce said image data for each further line plot for supply to the machine-learning model.

8. The computer-implemented method of claim 7, further comprising:
   preprocessing the input image in an attention-based recurrent neural network to produce said image data for each line plot in the input image.

9. The computer-implemented method of claim 1, further comprising:
   after annotating a set of digital images with respective ground truth labels, using the set of images as training images for further training of the machine-learning model via a supervised learning process.

10. The computer-implemented method of claim 1, further comprising:
    indicating association between each control point and a portion of the spline defined by that control point in the graphical user interface.

11. The computer-implemented method of claim 1, further comprising:
    storing each control point of the set of control points as a pixel location in the image.

12. A computer program product comprising:
    one or more computer readable storage media and program instructions stored on the one or more computer readable storage media, the program instructions comprising:
    program instructions to annotate digital images of line plots with ground truth labels, wherein the program instructions to annotate digital images comprise:
    program instructions to, for each digital image, supply image data defining a digital image of the digital images of a line plot to a machine-learning model trained to generate a set of control points defining a spline corresponding to the line plot, wherein generating a set of control points defining a spline comprises successively adding control points to the set of control points defining the spline in a recurrent neural network until a stop probability corresponding to a respective control point traverses a threshold level;
    program instructions to display the spline, and the set of control points defining the spline, superimposed on the image in a graphical user interface;
    program instructions to, in response to user manipulation, via the graphical user interface, of one or more control points, dynamically adjust the displayed spline in accordance with manipulated control points whereby the displayed spline can be adjusted for conformity with the line plot; and
    program instructions to store the set of control points defining the spline for the adjusted spline as a ground truth label for the image.

13. The computer program product of claim 12, wherein the recurrent neural network is trained to generate, for each added control point, a stop probability whose value indicates a measure of correspondence between the spline and the line plot, said program instructions being executable to cause the recurrent neural network to successively add control points to said set until said stop probability traverses a threshold level.

14. The computer program product of claim 13, wherein the program instructions stored on the one or more computer readable storage media further comprise:

program instructions to train the recurrent neural network via an iterative training process comprising, for a set of training images of line plots, program instructions to supply image data defining each training image to the recurrent neural network and updating weights of the network to optimize a function dependent on difference between the sets of control points and stop probabilities generated by the network for the training images and predetermined control points and stop probabilities for the training images.

15. The computer program product of claim 12, wherein the recurrent neural network is trained for generating the set of control points based on optimization of a function dependent on offset between points on the spline and points on the line plot in an image, wherein the program instructions cause the recurrent neural network to successively add control points to said set until a stop criterion, dependent on said offset, is satisfied.

16. The computer program product of claim 15, wherein the program instructions stored on the one or more computer readable storage media further comprise:

program instructions to train the recurrent neural network via an iterative training process comprising, for a set of training images of line plots, program instructions to supply image data defining each training image to the machine learning model and updating weights of the network to optimize said function.

17. The computer program product of claim 12, wherein the program instructions stored on the one or more computer readable storage media further comprise:

program instructions to preprocess an input image, comprising one or more line plots, to produce said image data for an image of a single line plot for supply to the machine-learning model and, if the input image contains any further line plots, to iteratively preprocess the input image to produce said image data for each further line plot for supply to the machine-learning model.

18. A computer system comprising:

one or more computer processors;

one or more computer readable storage media; and program instructions to annotate digital images of line plots with ground truth labels, wherein the program instructions to annotate digital images comprise:

program instructions to, for each digital image, supply image data defining a digital image of the digital images of a line plot to a machine-learning model trained to generate a set of control points defining a spline corresponding to the line plot, wherein generating a set of control points defining a spline comprises successively adding control points to the set of control points defining the spline in a recurrent neural network until a stop probability corresponding to a respective control point traverses a threshold level;

program instructions to display the spline, and the set of control points defining the spline, superimposed on the image in a graphical user interface;

program instructions to, in response to user manipulation, via the graphical user interface, of one or more control points, dynamically adjust the displayed spline in accordance with manipulated control points whereby the displayed spline can be adjusted for conformity with the line plot; and program instructions to store the set of control points defining the spline for the adjusted spline as a ground truth label for the image.

* * * * *